US005674627A

United States Patent [19]

Uesugi et al.

[11] Patent Number: 5,674,627

[45] Date of Patent: Oct. 7, 1997

[54] ALUMINUM ALLOY SHEET HAVING EXCELLENT PRESS FORMABILITY AND SPOT WELDABILITY

[75] Inventors: Yasuji Uesugi; Naoki Nishiyama; Rinsei Ikeda; Koichi Hashiguchi; Yoshihiro Matsumoto, all of Chiba; Motohiro Nabae; Masaaki Kurihara, both of Tokyo, all of Japan

[73] Assignees: Kawasaki Steel Corporation; The Furukawa Electric Co., Ltd., both of Japan

[21] Appl. No.: 515,997

[22] Filed: Aug. 16, 1995

[30] Foreign Application Priority Data

Aug. 19, 1994 [JP] Japan .................................... 6-195170

[51] Int. Cl.$^{6}$ ............................ B32B 15/08; B32B 15/20

[52] U.S. Cl. .......................... 428/461; 428/457; 428/472

[58] Field of Search .................................... 428/461, 650, 428/615, 469, 472, 341, 500, 457; 29/527.1, 527.2

[56] References Cited

U.S. PATENT DOCUMENTS

| | | | |
|---|---|---|---|
| 3,955,016 | 5/1976 | Robertson | 427/178 |
| 4,939,034 | 7/1990 | Sobata et al. | 428/469 |
| 5,061,575 | 10/1991 | Mohri et al. | 428/623 |
| 5,069,966 | 12/1991 | Colalacovo et al. | 428/336 |
| 5,272,011 | 12/1993 | Tanaka et al. | 428/469 |
| 5,308,709 | 5/1994 | Ogino et al. | 428/623 |
| 5,393,605 | 2/1995 | Miyoshi et al. | 428/327 |
| 5,395,687 | 3/1995 | Totsuka et al. | 428/327 |

FOREIGN PATENT DOCUMENTS

| | | |
|---|---|---|
| 0 312 307 A1 | 4/1989 | European Pat. Off. . |
| 0 497 560 A2 | 8/1992 | European Pat. Off. . |
| 557 928 A1 | 9/1993 | European Pat. Off. . |
| 7090599 | 4/1995 | Japan . |
| A-07 090 599 | 4/1995 | Japan . |

OTHER PUBLICATIONS

Mark et al., Encyclopedia of Polymer Science and Engineering, 2nd Edition, vol. 10, pp. 1–19, (no date available).

*Primary Examiner*—John Zimmerman
*Attorney, Agent, or Firm*—Austin R. Miller

[57] ABSTRACT

An aluminum alloy sheet combining excellent press formability and spot weldability is disclosed. A chromate film of about 1.0 to 50.0 mg/m$^2$ expressed in terms of metallic chromium is formed as a first layer on an aluminum alloy sheet, and an organic resin film containing about 60–95% by weight of organic lubricant and having a thickness of 0.02 to 0.90 μm in terms of dry thickness is formed as a second layer on the chromate film. As the organic lubricant, a high-density polyethylene having a mean molecular weight of about 900 to 15,000 and a density of about 0.93 g/ml or more is preferable. This aluminum alloy sheet can be effectively used for automobile body applications.

10 Claims, No Drawings

ALUMINUM ALLOY SHEET HAVING EXCELLENT PRESS FORMABILITY AND SPOT WELDABILITY

BACKGROUND OF THE INVENTION

1. Field of the Invention

The present invention relates to an organic resin-treated aluminum alloy sheet, suitable for automobile body applications, which combines excellent spot weldability and press formability.

2. Description of the Related Art

In recent years, global environmental concerns have provided strong incentive for reducing the weight of automobile bodies. Therefore, the use of aluminum alloy sheet having a high strength-to-weight ratio has been investigated, with such aluminum alloy sheet having already been put into practical use in several parts of the automobile. However, the use of aluminum alloy sheet in automobile bodies has thus far been limited to lightly pressformed members, such as hoods and the like, because aluminum alloy sheets have very poor formability compared to steel sheets. The use of aluminum alloy sheet for doors or other complicated and heavily formed structures is considered difficult by conventional standards.

The poor formability of conventional aluminum alloy sheet results from poor ductility of the base aluminum alloy sheet, the strong affinity of aluminum alloy sheet for cast iron or other materials commonly used in pressing dies (due to the low melting point and softness of aluminum), and higher friction coefficient caused by adherence to the die.

Further, the use of aluminum alloy sheet shortens spot-welding electrode life as compared to steel sheet, thereby reducing production efficiency of the automobile body. That is, spot welding of aluminum alloy sheet sharply decreases the number of acceptably strong welding spots that one electrode can produce without undergoing maintenance and/or being replaced. Thus, production efficiency is markedly reduced.

Various efforts have been made to improve the formability and spot weldability of aluminum alloy sheet. Japanese Unexamined Patent Publication Nos. 61-130452 and 3-287739 disclose a method of manufacturing an aluminum alloy sheet in which elongation property of aluminum alloy sheet is improved by restricting the upper quantity limit of iron and silicon, and increasing the amount of magnesium added so as to improve formability. In addition, Japanese Unexamined Patent Publication No. 4-123879 discloses a technique of controlling the thickness of an oxide film formed on the surface of the aluminum alloy sheet to produce a suitable electrical resistance so as to increase the electrode life.

However, in order to obtain a highly-ductile alloy sheet as disclosed in Japanese Unexamined Patent Publication Nos. 61-130452 and 3-287739, the use of an expensive ground metal with high purity is essential, and formability is not improved enough to justify the cost. Moreover, controlling surface electrical resistance effectively improves weldability, but completely fails to improve formability at all.

Since improving the formability of aluminum alloy sheet is considered most crucial to automotive applications, attempts have been made to improve formability of the aluminum alloy sheet by applying thereto a lubricating resin film.

For example, Japanese Unexamined Patent Publication Nos. 6-184587 and 6-305074 disclose a technique for improving formability by a water-soluble organic lubricating resin treatment: that is, by providing film-removing type solid lubricants such that a coating film is melted and removed by a zinc phosphate conversion treatment performed during degreasing process which is done after a press working. However, it is difficult to prevent deterioration of weldability with these film-removing type lubricating resin films. Moreover, resin is incompletely removed. Additionally, resistance to filfarm corrosion and corrosion greater than that of bare aluminum alloy sheet does not result because the zinc phosphate treatment is inferior.

Japanese Unexamined Patent Publication Nos. 4-268038 and 6-55137 disclose techniques in which an organic lubricating resin film, typically applied to zinc series plated steel sheet, is applied to aluminum alloy sheet. That is, techniques are disclosed in which a non-film-removing type resin typically used for lubricating steel sheet and composed of a base resin and organic lubricants (such as a wax and a fluorine resin), is applied to a chromated aluminum alloy sheet and then dried.

These techniques, however, are intended only to improve corrosion resistance and press formability; weldability improvement is not considered at all. In fact, spot weldability of the aluminum alloy sheet is greatly harmed by the presence of an organic resin film.

As a technique for minimizing harm to spot weldability caused by the organic resin film, the expedients of reducing the thickness of the resin, or adding electrical conductive assistants to the resin, may be considered. Japanese Unexamined Patent Publication No. 3-18936 discloses an improved technique in which an extremely thin resin layer is applied to the surface of the aluminum alloy original sheet. However, an organic lubricant is not present in the resin, which prevents realization of effective press formability.

Japanese Unexamined Patent Publications Nos. 5-309331 and 5-311454 disclose a technique in which electrically conductive assistants (such as iron phosphide) which are also utilized for the lubricating steel sheet (for example, disclosed in Japanese Patent Publication No. 62-73938) are incorporated in the lubricating resin. However, this technique does not provide significant weldability improvement, and some inorganic electrically conductive substances actually adversely affect formability and interfere with coating properties of the lubricating resin (causing roping, etc.).

The technique disclosed in Japanese Unexamined Patent Publications Nos. 5-309331 and 5-311454 utilizes a large quantity of organic lubricant (fluorine resin as an example) in the resin to improve formability. While in some cases weldability may be improved to some extent, the degree of improvement is not significant.

When aluminum alloy sheet is used for automobile body plates, it is important for the sheet to have excellent press formability and weldability.

However, when a conventional organic film is formed on the aluminum alloy sheet to improve press formability, spot weldability deteriorates to the extent that the use of aluminum alloy sheet becomes impractical.

This problem is inherent to aluminum alloy sheet, and is caused by the low electrical resistance of aluminum alloy sheet (about ¼ of that found in steel sheet). It is very difficult to improve both press formability and spot weldability of the aluminum alloy sheet by the application of conventional organic film used for lubricating steel sheet, or by modification of such film known in the art.

SUMMARY OF THE INVENTION

It is an object of the present invention to provide an aluminum alloy sheet coated with a non-film-removing type organic lubricating resin in which spot weldability is remarkably improved without the addition of inorganic electrical conductive assistants and without compromising the improved press formability resulting from the organic lubricating resin. Both weldability and formability are improved such that the aluminum alloy sheet can be used in place of steel even in a conventional production line.

After studying problems related to spot weldability of aluminum alloy sheet, we have made the following remarkable discoveries.

An organic lubricating resin film (hereinafter referred to as the organic film) formed on a lubricated steel sheet generally contains about 1% of an organic lubricant. Such organic film formed on an aluminum alloy sheet exhibits a very high electrical resistance. The organic film generally has a volume resistance of about $10^{15}$ Ω·cm. Even if the thickness of the organic film is reduced to about 1 μm, interlayer resistance is still about $10^{10}$ Ω·cm or more. This high electrical resistance causes the resin layer to become overheated, thereby sharply degrading spot weldability.

We have now discovered that combined steps of applying an extremely thin layer of organic film and, in combination, greatly increasing the organic lubricant content of the organic film, work together and are exceptionally effective for reducing spot welding resistance.

We have also found that, where chromate film has been applied to the sheet as a preparatory treatment, spot weldability of the sheet can be significantly improved by limiting the thickness of the oxide film formed on the surface of the aluminum alloy sheet, as well as the thickness of chromate film.

The step of simply reducing the thickness of the organic film, taken alone, deteriorates press formability. However, if the content of the organic lubricant in the above organic film is sharply increased concurrently with the reduction of the thickness of the organic film, weldability and press formability are surprisingly both improved.

According to an aspect of the present invention, there is provided an aluminum alloy sheet having excellent press formability and spot weldability which comprises an aluminum alloy sheet; a chromate film formed on the surface of the aluminum alloy sheet, the chromate film having a coating weight in the range of about 1.0 to 50.0 mg/m$^2$ in terms of metallic chromium; and a further layer of organic resin film containing about 60–95 wt % of organic lubricant and having a dry thickness of about 0.02 to 0.90 μm.

It is preferable that the thickness of the oxide film formed on the surface of the aluminum alloy sheet is about 100 Å or less.

It is also preferable that the organic lubricant be a high-density polyethylene having a mean molecular weight of about 900 to 15,000 and a density of about 0.93 or more.

DETAILED DESCRIPTION OF THE INVENTION

The present invention will now be described in more detail.

The composition of the aluminum alloy sheet used in the present invention is not particularly limited. It is possible to utilize all kinds of the known aluminum alloy sheets. In particular, aluminum alloy sheets defined in the JIS 5000 series or the JIS 6000 series which are now used for automobiles, or under consideration for use therein, may be suitably utilized. Also, various kinds of aluminum alloy sheets defined in JIS H4000 may be suitably utilized.

The aluminum alloy sheet to be used in the present invention may preferably have a surface roughness of about 0.8 μm or less in terms of Ra (arithmetical mean deviation of profile defined in JIS B0601).

The press formability of the aluminum alloy sheet may be improved by improving its surface frictional coefficient. It is very effective to form an organic film containing an organic lubricant on the surface of the aluminum alloy sheet. In the present invention, reducing the surface roughness of the aluminum alloy sheet allows the application of a thinner layer of organic film, thereby improving overall press formability.

Although reducing the thickness of the organic film is effective for improving spot weldability, the reduced thickness downgrades the press formability of the sheet. According to the present invention, however, such deterioration is prevented by increasing the content of the organic lubricant contained in the organic film.

The Ra value of the aluminum alloy sheet according to the present invention is preferably controlled to about 0.8 μm or less, more preferably about 0.5 μm or less, thereby allowing for a thinner application of the organic film so that spot weldability and press formability are further improved.

Further, in order to form a uniform chromate film, and to improve spot weldability by lowering welding resistance, it is desirable to remove at least a portion of the oxide film formed on the sheet surface by performing an etching treatment or the like. Enough oxide film should be removed to reduce the thickness of the oxide film to about 100 Å or less.

By limiting the thickness of the oxide film formed on the surface of the aluminum alloy sheet to about 100 Å or less, preferably about 50 Å or less, spot weldability can be further improved.

As the etching treatment, any one of an alkaline etching treatment where an alumina ($Al_2O_3$) layer is removed in an alkaline solution, a pickling treatment where mainly a magnesia (MgO) layer is removed in an acid solution, and a pickling treatment after the alkaline etching treatment may be employed.

Conventional alkaline etching and pickling treatments utilizing commercially available treating liquids can be used. For example, caustic soda, caustic potash or the like may be used as treating liquid in the alkaline etching treatment, and sulfuric acid, phosphoric acid, nitric acid, hydrofluoric acid and a mixed solution of nitric acid and hydrofluoric acid may be used in the pickling treatment.

In the aluminum alloy sheet, particularly in an Al—Mg series aluminum alloy sheet, the oxide film formed on the surface thereof is mainly composed of acid soluble MgO. MgO may be dissolved and removed during the chromate treatment process by utilizing a strong acid chromate liquid (as described later) so that the thickness of the oxide film may be reduced to about 100 Å or less. Other oxide film removing treatments may be omitted in such a case.

When an oxidation inhibiting element such as Be is added to the aluminum alloy sheet, the formation of oxide film during the annealing process is inhibited. Thus, in such an aluminum alloy sheet, the thickness of the oxide film may be less than about 100 Å prior to any oxide film removal treatment. In this case, it is also possible to omit the oxide film removal treatments.

In the present invention, an aluminum alloy sheet is subjected to chromate treatment so as to form a chromate film. A conventional chromate treatment may be utilized. For example, any of a reactive-type chromate treatment, a coat-type chromate treatment and an electrolytic chromate treatment may be used. From the viewpoint of ease of treatment, the reaction-type chromate treatment or the coat-type chromate treatment may be preferable.

In a conventional reaction-type chromate treatment when applied to a steel sheet, the steel sheet is immersed in a strong acid solution containing chromic acid, phosphoric acid, nitric acid and hydrofluoric acid, then rinsed and dried. In the reaction-type chromate treatment applied to an aluminum alloy sheet, it is necessary to include about 1 to 20% by weight of hydrofluoric acid in the strong acid solution so as to 5 increase the activity of the aluminum alloy sheet. Examples of the chromate films formed by the reaction-type chromate treatment include chromic acid chromate film, and phosphoric acid chromate film. There is no significant difference in properties, such as corrosion resistance and subsequent adhesion of the organic resin film, between these chromate films.

The chromate film according to the coat-type chromate treatment may be formed as follows. An aqueous solution containing a partially reduced chromic acid as a major component and one or more components among phosphoric acid, an acrylic resin and silica particles is directly applied to the original sheet by roll coating, spraying or a dip coating. Thereafter, the coating weight of the film is adjusted by an air-knife and roll squeeze method, and then the film is baked and dried at 100° to 200° C. without rinsing.

The chromate film according to the coat-type chromate treatment can result in uneven film coating (i.e., an increased recessed portion). Thus, it is desirable to increase the coating weight of the chromate film. In addition, the content of alkali-soluble chrome (or chromium) in the chromate film is increased. This is advantageous for corrosion resistance, but too much alkali-soluble chrome (or chromium) may cause dissolution of chrome during painting of the automobile. Therefore, it is preferable that the content of chrome (or chromium) undissolved in the alkaline solution be at least about 70% by weight based on the total coating weight of the chrome (or chromium), which is achieved by degreasing.

Further, according to the coat-type chromate treatment, it is possible to incorporate electrical conductive assistants such as pulverized metal (zinc, aluminum, etc.), iron phosphide, tin oxide and carbon black in the chromate film so as to increase conductivity of the chromate layer, thereby improving weldability. And, the addition of silica, alumina, molybdic salt and tungsten salt to the chromate film may improve corrosion resistance and adhesion of the lubricant resin coating, to 50.0 mg/m$^2$, preferably about 5 to 25 mg/m$^2$, in terms of and thus may be added as needed.

The coating weight of the chromate film is about 1.0 metallic chromium.

By increasing the coating weight of the chromate film to about 1.0 mg/m$^2$ or more, dissolution of the base aluminum during the zinc phosphate treatment can be suitably prevented, and sufficient adhesion of the upper organic film can be obtained.

When the coating weight of the chromate film is increased, spot weldability tends to be deteriorated. However, by reducing the coating weight to about 50.0 mg/m$^2$ or less, effective spot weldability can be achieved.

In the aluminum alloy sheet according to the present invention, an organic coating containing about 60–95% by weight of the organic lubricant and having a dry thickness of about 0.02 to 0.90 μm is formed on the chromate film.

The organic film is essentially composed of a base resin and an organic lubricant.

The base resin can utilize various known solvent series or water series resins as used for lubricating steel sheet. Examples of such base resins include at least one resin selected from epoxy resin, alkyd resin, acrylic resin, urethane resin, phenol resin, melamine resin, polyvinyl butyral resin, polyester resin and modified resin such as urethane-modified epoxy resin and acrylic-modified urethane resin, for example. From the viewpoint of weldability and adhesion of the electrodeposition coating, epoxy resins, urethane resins, acrylic resins and polyester resins, or mixtures thereof may be preferably employed.

Various kinds of commercially available resins may be utilized as the base resin.

The organic lubricant added to the base resin may be an organic substance which is generally referred to as "wax" and having a melting or softening temperature under 200° C. while having a low melt viscosity. Natural wax such as plant wax, animal wax or mineral wax, petroleum wax, synthetic wax of synthetic hydrocarbon series and oxidized and/or modified waxes thereof may be used.

Examples of such wax include natural wax, such as montan wax, paraffin wax, micro-crystalline wax, and synthetic wax such as Fischer-Tropsch wax, polyethylene wax and polypropylene wax. Examples of the synthetic resin may include the Teflons (fluorine resin such as poly-4-ethylene fluoride resin, polyvinyl fluoride resin or polyvinylidene fluoride resin) wax. Although Teflon waxes are very effective for improving formability, they do not melt during welding and adversely affect weldability. Therefore, it is undesirable to use a Teflon wax alone.

Polyethylene wax is preferably used because it is inexpensive yet highly effective for improving press formability. A chemically stable high-density polyethylene wax which causes little melting and swelling of press wash oil, and which has a molecular weight of about 900 to 15,000 and a density of about 0.93 g/cm$^3$ or more is more preferable.

Various kinds of commercially available lubricants may be utilized as the organic lubricant.

Further, the melting point (or the softening point) of the organic lubricant is preferably in the range of about 60° to 150° C. If the melting point is about 60° C. or less, the benefit of improved formability is reduced because fluidity of the organic lubricant is increased excessively under the extreme pressure conditions created during press forming. On the other hand, if the melting point exceeds about 150° C., spot welding resistance undesirably increases.

During press forming of automobiles, the die temperature may change during continuous pressing, whereby wax performance may change. As a counteractive measure, it is effective to use two or more waxes each having a different melting point (or the softening point).

In the aluminum alloy sheet according to the present invention, the content of the organic lubricant in the organic film is a critical factor in improving spot weldability. It is essential that about 60–95% by weight of the organic lubricant is contained in the organic film.

Although the mechanism of the beneficial action of the organic lubricant of the invention is unclear at present, it is thought to be as follows. That is, the organic lubricant, particularly the organic lubricant having a low melting point typified by polyethylene, melts and volatilizes during the early stage of the spot welding, thus easily forming welding points. Therefore, the organic lubricant does not contribute to welding resistance. This fact can be confirmed from our discovery that welding resistance correlates with the thickness of the base resin, and not the content of the organic lubricant in the organic film.

Therefore, by reducing the thickness of the organic film and substantially increasing the content of the organic lubricant in the organic film, an aluminum alloy sheet combining excellent spot weldability with excellent moldability can be realized.

If the content of organic lubricant in the organic film is about 60% by weight or less, spot weldability is not sufficiently improved. If the content of organic lubricant exceeds about 95% by weight, the applied organic film can be removed during press working, with adverse effect on adhesion of the electrodeposition coating. Therefore, according to the present invention, the content of organic lubricant is limited to about 60–95% by weight. A content of about 65 to 90% by weight is preferable.

According to the aluminum alloy sheet of the present invention, the organic lubricant is an essential component of the organic film (the base resin). One or more additives among extender pigments such as carbonate and silicate, rust preventing pigments such as silica, chromic acid salt, phosphate and lead salt, rust preventive agents such as amine compounds and phenolic carboxylic acid, electrically conductive pigments such as carbon, iron phosphide and tin oxide, color pigments such as titanium oxide and carbon, and dispersion stabilizing agents may be added to the organic coating, as needed.

When these additives are added to the organic film, the organic lubricant content should be controlled at about 60–95% by weight based on the entire organic film (the total of the organic lubricant, the base resin and the additives).

The thickness of the organic film containing these organic lubricants should be about 0.02 to 0.90 μm, preferably about 0.10 to 0.50 μm in terms of dry thickness. If the dry thickness of the organic film is less than about 0.02 μm, press formability is not improved sufficiently. If the thickness exceeds about 0.90 μm, spot weldability is deteriorated. Therefore, the dry thickness is set to a range of about 0.02 to 0.90 μm.

The formability of the organic resin-treated aluminum alloy sheet according to the present invention has been described with the condition that press wash oil is applied thereon. However, the formability is effective even in the case where press wash oil is not applied. In addition, the oil having high lubricating properties to which a high-viscosity agent or an extreme pressure agent (such as calcium stearate) is added is applied to the aluminum alloy sheet, formability of the aluminum alloy sheet can be further improved.

There are no restrictions regarding the method of forming these organic films. The base resin and the organic lubricant may be dissolved (or dispersed) in a suitable solvent, and additives may be incorporated therein as needed to prepare an organic lubricating resin coating. The coating may be applied to the aluminum alloy sheet by a known method, such as roll coating or curtain flow coating, and then baked.

The condition of baking the coating after application is not particularly restricted. However, it is desirable to set a maximum attainable temperature of the sheet within the range of about 80° to 180° C. because the aluminum alloy sheet of the invention has excellent coating adhesion, and therefore can be manufactured and treated with high thermal efficiency in a short period of time.

The aluminum alloy sheet according to the present invention has organic film on both surfaces thereof. However, it is possible that only one surface of the sheet may be covered with the resin film as described above, while leaving the other surface as an untreated aluminum alloy sheet, or as merely an etching surface or having a chromate film formed thereon.

The present invention will be described by way of illustrative examples. The examples are not intended to limit the invention defined in the solicited claims.

EXAMPLE 1

Using JIS A5182-0 materials and JIS A6111-T4 materials, aluminum alloy sheets each having a thickness of 1 mm and variously adjusted surface roughness were prepared by varying the degree of roughness at the time of rolling.

These sheets were etched after being annealed so as to adjust thicknesses of the oxide films formed on the sheet surfaces. Thereafter, these sheets were subjected to a reaction-type chromate treatment to form chromate films thereon.

Organic lubricating resin coatings containing various kinds of base resins and organic lubricants shown below were applied to the above chromate films by a roll coating method, and then baked such that the maximum temperature attained by the sheets was 150° C. Organic (lubricating) films were thusly prepared on the aluminum alloy sheet.

The resulting aluminum alloy sheets were tested for press formability, spot weldability and adhesion after coating.

The methods used to evaluate the aluminum alloy sheets will now be described, and the results of evaluation are summarized in Table 1.

(1) Measurement of surface roughness (arithmetical mean deviation of profile (R))

Surface roughness of each of the aluminum alloy sheets were measured with a three dimensional roughness gauge pursuant to JIS B0601. In this case, Ra (three dimensions) is represented by the following expression:

$$Ra=\frac{1}{S}\int_0^L\int_0^L |f(x,y)|dx\cdot dy$$

wherein S=L×L, and f(x, y) is a function representing a surface roughness curve.

(2) Conditions for the etching treatment

The aluminum alloy sheets were etched under the following condition so as to remove and control the oxide films formed on the surfaces thereof. The thickness of the oxide films after etching were measured by oxygen strength in a fluorescent X-ray analysis.

The etching treatment was performed by degreasing the aluminum alloy sheets, and then immersing them in a 25° C. aqueous solution containing 10% sulfuric acid.

(3) Conditions for the chromate treatment

The etched aluminum alloy sheets were immediately subjected to a chromate treatment under the following conditions. The coating weight of the chromate films after the treatment were measured by chrome strength in a fluorescent X-ray analysis, and represented in terms of metallic chromium.

The chromate treatment was performed through a reaction-type chromate treatment using Alchrome 713 (manufactured by Nihon Parkerizing Co., Ltd).

(4) Composition of organic (lubricating resin) films and dry thickness thereof

The dry thickness of the organic films was measured by carbon strength in a fluorescent X-ray analysis. In Table 1, symbol A describing the composition of the organic films represent the following:

Base resin A: Epoxy resin (Epikote 1007, manufactured by Yuka Shell Epoxy Inc.)

Organic lubricant A: Polyethylene (Sanwax 151-P manufactured by Sanyo Chemical Industries, Ltd.)

(5) Press formability test

Press wash oil (R303P, manufactured by Sugimura Chemical Corporation) was applied to the surfaces of the samples, then the samples were punched with a 70 mm diameter punch, followed by a high speed cupping test (speed: 500 mm/sec) with a punch diameter of 33 mm.

Press formability of each of the samples were evaluated as follows.

Good (◎): neither cracks nor galling were formed in the side faces of cylindrical sample pieces Normal (○): cracks were not formed, but galling was formed Poor (x): cracks were formed (6) Spot weldability test The electrode life of the aluminum alloy sheets after the treatment were evaluated using a single-phase AC welder under the following electrode and welding conditions.

| | |
|---|---|
| Electrode | |
| •Shape: dome (DR) type | •Tip diameter: 6.0 mm |
| •Tip curvature: 40 mmR | •Material: copper-chrome |
| Welding condition | |
| •Pressure applied: 300 kgf | |
| •Squeeze time: $^{30}/_{60}$ sec | |
| •Weld time: $^{3}/_{60}$ sec | •Holding time: $^{1}/_{60}$ sec |
| •Welding current: 25 kA | |

The smaller of the following two numbers was used to evaluate electrode life: the number of successful welds without any sticking by one electrode; and the number of successful welds by one electrode until the tensile shear strength of the nuggets fell short of 143 kgf.

Evaluation criteria were as follows.

Good (◎): electrode life was 2001 or more

Normal (○): electrode life was 1,000 to 2,000

Poor (x): electrode life was less than 1,000

(7) Adhesion after coating (coating properties) test

Various types of aluminum alloy sheets were subjected to zinc phosphate treatment using PB-L3020 (aluminum specification; manufactured by Nihon Parkerizing Co., Ltd.) and cation electrodeposition of organic resin (U-600; manufactured by Nippon Paint Co., Ltd.). A thickness of 20 μm was applied and then hardened by baking at 170° C. for 20 minutes. Thereafter the treated aluminum alloy sheets were immersed in pure water at 40° C. for 10 days. A 2 mm cross-cut adhesion test (100 mesh) was subsequently performed to evaluate adhesion of the electrodeposition by the number of residual coatings.

The evaluation criteria of adhesion were as follows.

Good (◎): the number of residual coatings was 100

Normal (○): the number of residual coatings was 80–99

Poor (x): the number of residual coatings was 79 or less

As is evident from Table 1, each of the Examples according to the present invention exhibit excellent spot weldability, which is due to the high content of organic lubricant in the organic resin film. However, the comparative examples exhibit poor adhesion after coating because of the exceedingly high content of organic lubricant. Sheet No. 4 exhibited somewhat poor formability because its surface roughness (Ra) exceeded 0.8 μm. However, the sheet is still suitable for all applications except those for which high formability properties are required.

TABLE 1

| | | Surface | Oxide film | | | | Organic (lubricating resin) film | | | | | | | |
|---|---|---|---|---|---|---|---|---|---|---|---|---|---|---|
| | | roughness | | Thick- | | Coating | | | Wax | Dry | Characteristics | | | |
| No. | Type of sheet | Ra (μm) | Procedure | ness (Å) | Type | weight (mg/m²) | Base resin | Wax | content (wt %) | thickness (μm) | Work-ability | Weld-ability | Coating properties | Classification |
| 1 | A5182 | 0.04 | A | 50 | A | 10 | A | A | 70 | 0.20 | ● | ● | ● | Present Example |
| 2 | A5182 | 0.21 | A | 50 | A | 10 | A | A | 70 | 0.20 | ● | ● | ● | Present Example |
| 3 | A5182 | 0.78 | A | 50 | A | 10 | A | A | 70 | 0.20 | ● | ● | ● | Present Example |
| 4 | A5182 | 0.82 | A | 50 | A | 10 | A | A | 70 | 0.20 | ○ | ● | ● | Present Example |
| 5 | A5182 | 0.52 | A | 50 | A | 10 | A | A | 93 | 0.35 | ● | ● | ● | Present Example |
| 6 | A5182 | 0.52 | A | 50 | A | 10 | A | A | 98 | 0.35 | ● | ● | x | Comparative Ex. |
| 7 | A6061 | 0.36 | A | 40 | A | 10 | A | A | 93 | 0.55 | ● | ● | ● | Present Example |
| 8 | A6061 | 0.36 | A | 40 | A | 10 | A | A | 98 | 0.55 | ● | ● | x | Comparative Ex. |

EXAMPLE 2

Using JIS A5182-0 materials and JIS A6111-T4 materials, various types of organic resin-coated aluminum alloy sheets were prepared and evaluated as in Example 1, but under the conditions shown in Table 2. Each of the conditions and evaluation results are shown in Table 2. The conditions which differ from those of Example 1 are as follows.

(1) Conditions for the etching treatment

In Example 2, some etchings were conducted under the following conditions instead of the etching (procedure A) described in Example 1.

Procedure B: Degreasing plus immersion in a 70° C. aqueous solution containing 5% sodium hydroxide (NaOH), plus immersion in an aqueous solution containing 10% of nitric acid.

Procedure C: Degreasing plus immersion in a 25° C. aqueous solution containing 10% phosphoric acid.

Procedure D: Degreasing only (2) Conditions for the chromate treatment

In Example 2, some chromate treatments were conducted under the following conditions instead of the chromate treatment (condition A) described in Example 1.

Condition B: Coat-type chromate treatment using Zinchrome R1415A (manufactured by Nihon Parkerizing Co., Ltd.)

Condition C: Reaction-type phosphoric acid chromate treatment using Alchrome K702)

(3) Composition of organic (lubricating resin) films and dry thickness thereof

In Example 2, the following organic films were sometimes used instead of the organic film (the base resin A, the organic lubricant A) described in Example 1.

Base resin

B: urethane resin (Mitec BL-100, manufactured by Mitsubishi Chemical Industries Ltd.);

C: acrylic resin (Dianal BR106, manufactured by Mitsubishi Rayon Co., Ltd.);

D: polyester resin (Almatex P646, manufactured by Mitsui Toatsu Chemicals, Inc.);

E: phenol resin (Super Beckacite, manufactured by Dainippon Ink and Chemicals, Inc.); and F: polyvinyl butyral resin (Denka-butyral, manufactured by Denki Kagaku Kogyo K.K.)

Organic lubricants

B: polyethylene (Hi-wax 800 P, manufactured by Mitsui Petrochemical Industries, Ltd., molecular weight: 8000, density: 0.96);

C: polyethylene (Hi-wax 100 P, manufactured by Mitsui Petrochemical Industries, Ltd., molecular weight: 900, density: 0.95);

D: B+C (mixing ratio: 50:50);

E: B+Teflon (Daikin Polyflon TFE Low Polymer LP-100, trade name in U.S., manufactured by Asahi Glass Co., Ltd.);

F: polyethylene (homemade; molecular weight: 18,000; density: 0.92);

G: polyethylene (homemade; molecular weight: 800; density: 0.80); and

H: polypropylene (Viscol 550 P, manufactured by Sanyo Chemical Industries, Ltd.).

(4) Press formability test

Press wash oil (R303P, manufactured by Sugimura Chemical Corporation) was applied to the surfaces of the samples, then the samples were punched with a 95 mm diameter punch followed by a high speed cupping test (speed: 500 mm/sec) with a punch diameter of 50 mm (radius R of fillet: 8 mm) while varying blanking holding force (BHF).

Formability of A5182 alloy sheet was evaluated as follows.

Good (◎): the alloy sheet was punched out by a BHF of 5 tons or greater

Normal (○):2 to 5 tons of BHF were required to punch out the alloy sheet

Poor (x): 2 tons or less of BHF was required to punch out the alloy sheet

Formability of A6111 alloy sheet was evaluated as follows.

Good (◎): the alloy sheet was punched out by a BHF of 4 tons or greater

Normal (○): BHF of 2 to 4 tons was required to punch out the alloy sheet

Poor (x): BHF of 2 tons or less was required to punch out the alloy sheet (5) Spot weldability test The electrode life of the aluminum alloy sheets after the treatment as evaluated using a single-phase AC welder under the following electrode and welding conditions.

| | |
|---|---|
| Electrode | |
| •Shape: dome (DR) type | •Tip curvature: 80 mmR |
| •Material: copper-chrome | |
| Welding condition | |
| •Pressure applied: 400 kgf | |
| •Squeeze time: 30/50sec | |
| •Weld time: 3/50sec | •Holding time: 1/50sec |
| •Welding current: 29 kA | |

The smaller of the following two numbers was used to evaluate electrode life: the number of successful welds without any sticking by one electrode; and the number of successful welds by one electrode until the tensile shear strength of welded portion (tensile shear strength of a nugget) defined in JIS Z3136 fell short of the A-class strength of 176 kgf/spot defined in JIS Z3140.

Evaluation criteria were as follows.

Good (◎): the smaller of the numbers was 2001 or

Normal (○): the smaller of the numbers was 1,000 to 2,000

Poor (x): the smaller of the numbers was less than 1,000

(6) Adhesion after coating (coating properties) test

Press wash oil (R303P) was applied to various types of aluminum alloy sheets, and the sheets were subjected to a zinc phosphate treatment using PB-L3020 (aluminum specification; manufactured by Nihon Parkerizing Co., Ltd.). Then, a 20 μm-thick cation electrodeposition of organic resin (U-600; manufactured by Nippon Paint Co., Ltd.), a 35 μm thick intercoating (KPX 50; manufactured by Kansai Paint Co., Ltd.) and a 35 μm thick top coating (B531; manufactured by Kansai Paint Co., Ltd.) were sequentially applied to the treated sheets. Thereafter, the thus-treated aluminum alloy sheets were immersed in 40° C. pure water for 10 days. Subsequently, a 2 mm cross-cut adhesion test (100 mesh) was performed to evaluate the electrodeposition adhesion by the number of residual coatings.

The evaluation criteria of the adhesion were as follows.

Good (◎): the number of residual coatings was 100

Normal (○): the number of residual coatings was 80 to 99

Poor (x): the number of residual coatings was 79 or 5 less

As is evident from Table 2, each of the Examples according to the present invention combine excellent press formability and spot weldability, while any one of press formability, spot weldability and adhesion after coating is poor in the comparative examples.

Some of the present Examples have normal-level formability, weldability, or coating properties because the surface roughness, thickness of the oxide film, coating weight of chromate, type of the base resin, type of organic lubricant and the content thereof, and thickness of the organic resin film are not within the optimum ranges. However, those aluminum alloy sheets are suitable for all applications except those requiring high formability, weldability and coating properties, respectively.

As described above, the aluminum alloy sheet according to the present invention is excellent in both press formability and spot weldability, and thus particularly suitable for automobile body applications.

Although the aluminum alloy sheet and method of manufacturing the same have been described in connection with specific forms thereof, it is to be understood that the present invention is not limited thereto, and that various improvements and modifications may be effected therein without departing from the spirit and scope of the invention.

TABLE 2

| No. | Type of sheet | Surface roughness Ra (μm) | Oxide film Procedure | Oxide film Thickness (Å) | Organic (lubricating resin) film Type | Coating weight (mg/m²) | Base resin | Wax | Wax content (wt %) | Dry thickness (μm) | Characteristics Workability | Weldability | Coating properties | Classification |
|---|---|---|---|---|---|---|---|---|---|---|---|---|---|---|
| 1 | A5182 | 0.82 | A | 45 | A | 12 | B | B | 70 | 0.20 | ○ | ● | ● | Present Example |
| 2 | A5182 | 0.48 | B | 22 | A | 12 | B | B | 70 | 0.20 | ● | ● | ● | Present Example |
| 3 | A5182 | 0.48 | C | 85 | A | 12 | B | B | 70 | 0.20 | ● | ○ | ● | Present Example |
| 4 | A5182 | 0.48 | D | 110 | A | 12 | B | B | 70 | 0.20 | ● | ○ | ● | Present Example |
| 5 | A5182 | 0.48 | A | 45 | — | 0 | B | B | 70 | 0.20 | ● | ● | x | Comparative Ex. |
| 6 | A5182 | 0.48 | A | 45 | A | 0.8 | B | B | 70 | 0.20 | ● | ● | x | Comparative Ex. |
| 7 | A5182 | 0.48 | A | 45 | A | 1.5 | B | B | 70 | 0.20 | ● | ● | ○ | Present Example |
| 8 | A5182 | 0.48 | A | 45 | B | 20 | B | B | 70 | 0.20 | ● | ● | ● | Present Example |
| 9 | A5182 | 0.48 | A | 45 | C | 12 | B | B | 70 | 0.20 | ● | ● | ● | Present Example |
| 10 | A5182 | 0.48 | A | 45 | A | 8 | B | B | 70 | 0.20 | ● | ● | ● | Present Example |
| 11 | A5182 | 0.48 | A | 45 | B | 53 | B | B | 65 | 0.20 | ● | x | ● | Comparative Ex. |
| 12 | A5182 | 0.48 | A | 45 | A | 12 | B | B | 55 | 0.20 | ● | x | ● | Comparative Ex. |
| 13 | A5182 | 0.48 | A | 45 | A | 12 | B | B | 62 | 0.20 | ● | ○ | ● | Present Example |
| 14 | A5182 | 0.48 | A | 45 | A | 12 | B | B | 70 | 0.20 | ● | ● | ● | Present Example |
| 15 | A5182 | 0.48 | A | 45 | A | 12 | B | C | 70 | 0.20 | ● | ● | ● | Present Example |
| 16 | A5182 | 0.48 | A | 45 | A | 12 | B | D | 70 | 0.20 | ● | ○ | ● | Present Example |
| 17 | A5182 | 0.48 | A | 45 | A | 12 | B | E | 70 | 0.20 | ● | ○ | ● | Present Example |
| 18 | A5182 | 0.48 | A | 45 | A | 12 | B | F | 70 | 0.20 | ○ | ● | ● | Present Example |
| 19 | A5182 | 0.48 | A | 45 | A | 12 | B | G | 70 | 0.20 | ○ | ● | ● | Present Example |
| 20 | A5182 | 0.48 | A | 45 | A | 12 | B | H | 70 | 0.20 | ○ | ● | ○ | Present Example |
| 21 | A5182 | 0.48 | A | 45 | A | 12 | B | B | 83 | 0.20 | ● | ● | ● | Present Example |
| 22 | A5182 | 0.48 | A | 45 | A | 12 | B | B | 92 | 0.20 | ● | ● | ○ | Present Example |
| 23 | A5182 | 0.48 | A | 45 | A | 12 | B | B | 98 | 0.20 | ● | ● | x | Comparative Ex. |
| 24 | A5182 | 0.48 | A | 45 | A | 12 | A | B | 70 | 0.20 | ○ | ● | ● | Present Example |
| 25 | A5182 | 0.48 | A | 45 | A | 12 | C | B | 70 | 0.20 | ● | ● | ● | Present Example |
| 26 | A5182 | 0.48 | A | 45 | A | 12 | D | B | 70 | 0.20 | ● | ● | ● | Present Example |
| 27 | A5182 | 0.48 | A | 45 | A | 12 | E | B | 70 | 0.20 | ● | ○ | ● | Present Example |
| 28 | A5182 | 0.48 | A | 45 | A | 12 | F | B | 70 | 0.20 | ● | ○ | ● | Present Example |
| 29 | A5182 | 0.48 | A | 45 | A | 12 | B | B | 70 | 0.01 | x | ● | ● | Comparative Ex. |
| 30 | A5182 | 0.48 | A | 45 | A | 12 | B | B | 70 | 0.02 | ○ | ● | ● | Present Example |
| 31 | A5182 | 0.48 | A | 45 | A | 12 | B | B | 70 | 0.05 | ● | ● | ● | Present Example |
| 32 | A5182 | 0.48 | A | 45 | A | 12 | B | B | 70 | 0.48 | ● | ● | ● | Present Example |
| 33 | A5182 | 0.48 | A | 45 | A | 12 | B | B | 70 | 0.85 | ● | ○ | ● | Present Example |
| 34 | A5182 | 0.48 | A | 45 | A | 12 | B | B | 70 | 0.95 | ● | x | ● | Comparative Ex. |
| 35 | A6111 | 0.98 | A | 35 | A | 10 | B | B | 70 | 0.25 | ○ | ● | ● | Present Example |
| 36 | A6111 | 0.36 | A | 35 | B | 25 | B | B | 70 | 0.25 | ● | ● | ● | Present Example |
| 37 | A6111 | 0.36 | A | 35 | A | 10 | B | B | 63 | 0.25 | ● | ● | ● | Present Example |
| 38 | A6111 | 0.92 | A | 35 | A | 10 | B | B | 90 | 0.10 | ● | ● | ● | Present Example |
| 39 | A6111 | 0.36 | A | 35 | C | 10 | B | B | 70 | 0.25 | ● | ● | ● | Present Example |
| 40 | A6111 | 0.36 | A | 35 | A | 10 | A | C | 70 | 0.25 | ● | ● | ● | Present Example |
| 41 | A6111 | 0.36 | A | 35 | A | 10 | B | B | 88 | 0.25 | ● | ● | ● | Present Example |
| 42 | A6111 | 0.36 | A | 35 | A | 10 | B | B | 93 | 0.25 | ● | ● | ○ | Present Example |
| 43 | A6111 | 0.36 | A | 35 | A | 10 | B | B | 65 | 0.55 | ● | ○ | ● | Present Example |

What is claimed is:

1. An aluminum alloy sheet having excellent press formability and spot weldability, comprising:

an aluminum alloy sheet having a surface;

a chromate film formed on said surface of said aluminum alloy sheet, said chromate film having a coating weight in the range of about 1.0 to about 50.0 mg/m² in terms of metallic chromium; and an organic resin film containing organic lubricant in the range of about 60 to about 95% by weight, said organic resin film being formed as a lubricant layer on said chromate film, said organic lubricant having a melting point in the range of about 60° C. to about 150° C., and said organic resin film having a dry film thickness in the range of about 0.02 to about 0.90

2. An aluminum alloy sheet according to claim 1, further comprising an oxide film, said oxide film being positioned on said surface of said aluminum alloy sheet between said aluminum alloy sheet and said chromate film, said oxide film having a thickness which is less than about 100 Å.

3. An aluminum alloy sheet according to claim 1, wherein said organic lubricant is a high-density polyethylene having a mean molecular weight in the range of about 900 to about 15,000 and a density of about 0.93 g/cm³ or more.

4. An aluminum alloy sheet according to claim 2, wherein said organic lubricant is a high-density polyethylene having a mean molecular weight in the range of about 900 to about 15,000 and a density of about 0.93 g/cm³ or more.

5. An aluminum alloy sheet according to claim 1 wherein said organic resin film is selected from the group consisting of epoxy resin, urethane resin, acrylic resin, polyester resin, phenol resin and polyvinyl butyral resin.

6. An aluminum alloy sheet according to claim 1 wherein said organic lubricant is selected from the group consisting of polyethylene, polypropylene and polyethylene resin containing fluorine.

7. An aluminum alloy sheet having excellent press formability and spot weldability comprising:

an aluminum alloy sheet having a surface;

a chromate film formed on said surface of said aluminum alloy sheet, said chromate film having a coating weight in the range of about 1.0 to about 50.0 mg/m² in terms of metallic chromium; and an organic resin film containing organic lubricant in the range of about 60 to about 95% by weight, said organic resin film being formed as a lubricant layer on said chromate film, said organic resin film being selected from the group consisting of epoxy resin, urethane resin, acrylic resin, polyester resin, phenol resin and polyvinyl butyral resin, said organic lubricant having a melting point in the range of about 60° C. to about 150° C. and being selected from the group consisting of polyethylene, polypropylene and polyethylene resin containing fluorine, and said organic resin film having a dry film thickness in the range of about 0.02 to about 0.90 μm.

8. An aluminum alloy sheet according to claim 7, further comprising an oxide film, said oxide film being positioned on said surface of said aluminum alloy sheet between said aluminum alloy sheet and said chromate film, said oxide film having a thickness which is less than about 100 Å.

9. An aluminum alloy sheet according to claim 7, wherein said organic lubricant is a high-density polyethylene having a mean molecular weight in the range of about 900 to about 15,000 and a density of about 0.93 g/cm$^3$ or more.

10. An aluminum alloy sheet according to claim 8, wherein said organic lubricant is a high-density polyethylene having a mean molecular weight in the range of about 900 to about 15,000 and a density of about 0.93 g/cm$^3$ or more.

* * * * *

UNITED STATES PATENT AND TRADEMARK OFFICE

CERTIFICATE OF CORRECTION

PATENT NO. : 5,674,627

DATED : October 7, 1997

INVENTOR(S) : Yasuji Uesugi et al

It is certified that error appears in the above-identified patent and that said Letters Patent is hereby corrected as shown below:

In Column 5, line 16, please delete "5";
bridging lines 52 and 53, please delete "to 50.0 $mg/m^2$, preferably about 5 to 25 $mg/m^2$, in terms of"; and
line 54, after "1.0", please insert --to 50.0 $mg/m^2$, preferably about 5 to 25 $mg/m^2$, in terms of--.

In Column 12, line 43, please delete "5".

In Column 13, line 62, please change "0.90" to --0.90 μm. --.

Signed and Sealed this

Sixth Day of January, 1998

Attest:

BRUCE LEHMAN

*Attesting Officer*

*Commissioner of Patents and Trademarks*